March 6, 1956 P. SEITZ 2,737,012
SHOCK-ABSORBING BEARING
Filed Sept. 4, 1952
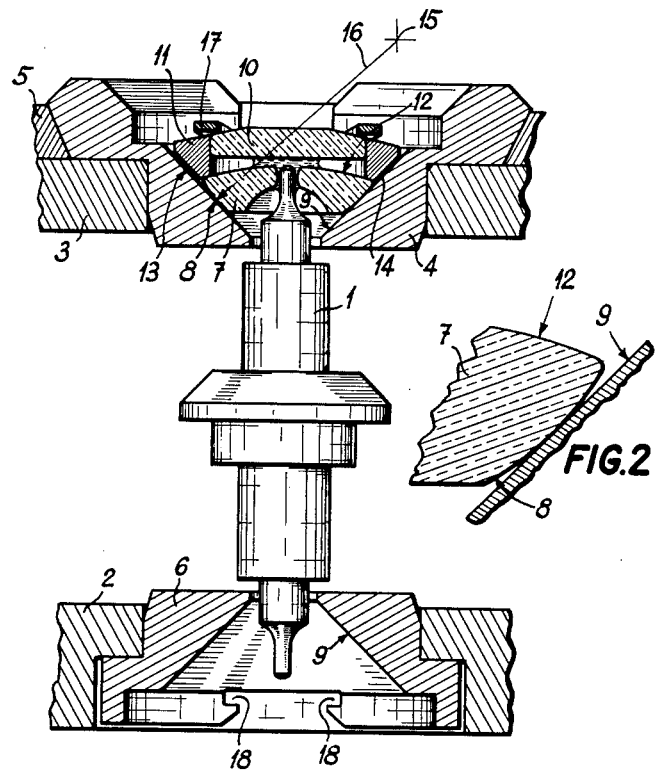
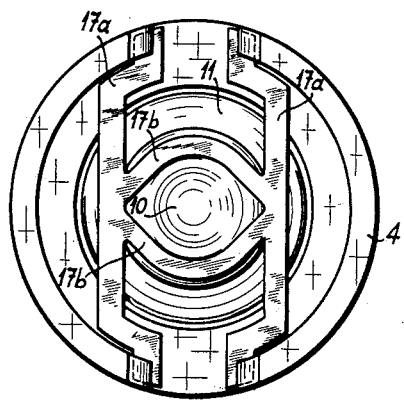
INVENTOR:
PIERRE SEITZ
By: J Delattre Seguy
Attorney

United States Patent Office 2,737,012
Patented Mar. 6, 1956

2,737,012

SHOCK-ABSORBING BEARING

Pierre Seitz, Les Brenets, Switzerland

Application September 4, 1952, Serial No. 307,800

Claims priority, application Switzerland
September 10, 1951

2 Claims. (Cl. 58—140)

The present invention relates to a shock-absorbing bearing, especially but not exclusively for a time-piece pivot, in which the metallic body of the bearing is provided with a conical seat.

According to a primary object of my invention, the bearing comprises a naked pierced jewel, a part at least of the periphery of which shows the shape of a surface of revolution resting on this seat, the generatrix of this surface being a curved line the convexity of which is turned outwards whereby, when this pierced jewel is displaced through the shocks applied to the shaft, the frictions occur between the jewel and the metallic body.

The annexed drawing shows, by way of example, one embodiment of the object of the invention.

Figure 1 is an axial sectional view of a balance staff with both its bearings.

Figure 2 is a view of a detail of Figure 1, on a greater scale.

Figure 3 is a plane view of the upper bearing.

The balance staff is designated by 1, the base plate by 2 and the cock by 3. The body 4 of the upper bearing holds in place the lever 5 partially shown. The body of the lower bearing is designated by 6. Except the difference of the shape of both bodies 4 and 6, the upper and lower bearings are identical. Therefore, only the upper bearing is hereafter disclosed in detail. The bearing comprises a pierced jewel or through-stone 7 the periphery of which shows a surface of revolution 8; the generatrix of this surface is an arc of a circle. This surface 8 rests on a conical seat 9 provided in the body 4. The endstone is constituted by a jewel 10 fitted in a bezel 11 resting on the outer convex face 12 of the pierced jewel 7. The periphery 13 of the bezel 11 is frusto-conical. A slight space 14 remains between the bezel 11 and the body of the bearing, when this bezel and the pierced jewel 7 are exactly concentric with the axis of the bearing. In this position, the centre of the circular generatrix of the surface 8 is constituted by a point 15 situated on the line 16 perpendicular to the conical seat 13 and passing through the contact point between the generatrix and the surface 13.

A spring 17 comprising two parallel arms 17a connected by two transverse circular elements 17b holds in place the endstone and the pierced jewel. The extremities of the arms 17a of this spring engage into entrances 18 provided therefore in the body of the bearing and are held therein elastically, while the transverse elements 17b bear on the endstone 10 for holding it in place. This spring 17 serves as absorber for the axial shocks as well as for the radial.

The surface 8 of the periphery of the jewel 7 is great enough to ensure a good seat to the jewel so that, when radial shocks occur, it displaces laterally and goes up along the conical seat 9 of the body while remaining parallel to itself, that is to say without rocking. During these displacements, it can happen that the bezel 11 comes into contact with the conical seat 9 of the body 4. Owing to its conical periphery 13, it becomes automatically centered when it comes back to its place. The pierced jewel and the endstone are thus centered independently one of the other, but by the same conical seat. Moreover, the suppression of the bezel of the pierced jewel, that is to say the use of a naked jewel, increases the accuracy of the concentricity between the central hole of the pierced jewel and its face 8. If this surface 8 was worked on a bezel the pressure of the jewel in this bezel would necessarily produce deformations of the bezel detrimental to the concentricity.

At least, the difference between the hardness of the pierced jewel (ruby with a hardness of 9 Mohs) and this of the body (brass with a hardness of 3 Mohs) is very favourable to the friction of these elements one on the other. The friction of the bezel on the pierced jewel 7 is likewise a friction of brass on ruby, as well as the friction of the spring 17 on the endstone 10 is a friction of steel on ruby, that amounts to saying that all the frictions which occur are between a metal and a ruby.

What I claim is:

1. In a shock-absorbing bearing, chiefly for a time-piece pivot, the combination of a metal body provided with an outwardly flaring conical seat, a bare through-stone resting centrally in said seat, having an outwardly convex outer surface and a lateral surface forming a surface of revolution engaging the conical seat and the generating line of which is convex with reference to the axis of said through-stone, an end-stone, a bezel in which said end-stone is fitted and resting on the outer surface of said through-stone, and having its lateral frusto-conical surface centrally carried with a slight clearance in said conical seat outwardly of the outer surface of said end-stone and means yieldingly urging the end-stone against the through-stone.

2. In a shock-absorbing bearing, chiefly for a time-piece pivot, the combination of a metal body provided with an outwardly flaring conical seat, a bare through-stone resting centrally in said seat, having an outwardly convex outer surface and a lateral surface forming a surface of revolution engaging the conical seat and the generating line of which is formed by the arc of a circle having its center on the outside of the outer surface of the through-stone, an end-stone, a bezel in which said end-stone is fitted and resting on the larger radius periphery of the outer surface of said through-stone, and having its lateral frusto-conical surface centrally carried with a slight clearance in said conical seat outwardly of the outer surface of said end-stone, and a spring bearing on the outer surface of the end-stone.

References Cited in the file of this patent

UNITED STATES PATENTS

| 2,372,972 | Morf | Apr. 3, 1945 |
| 2,596,449 | Van Haaften | May 13, 1952 |

FOREIGN PATENTS

| 604,721 | Great Britain | July 8, 1948 |
| 984,582 | France | Feb. 28, 1951 |